United States Patent
Ishida et al.

(10) Patent No.: US 10,562,822 B2
(45) Date of Patent: Feb. 18, 2020

(54) CUBIC BORON NITRIDE POLYCRYSTALLINE MATERIAL, CUTTING TOOL, WEAR RESISTANT TOOL, GRINDING TOOL, AND METHOD OF MANUFACTURING CUBIC BORON NITRIDE POLYCRYSTALLINE MATERIAL

(71) Applicant: Sumitomo Electric Industries, Ltd., Osaka-shi (JP)

(72) Inventors: Yuh Ishida, Itami (JP); Katsuko Yamamoto, Itami (JP); Hitoshi Sumiya, Itami (JP)

(73) Assignee: Sumitomo Electric Industries, Ltd., Osaka-shi (JP)

( * ) Notice: Subject to any disclaimer, the term of this patent is extended or adjusted under 35 U.S.C. 154(b) by 0 days.

(21) Appl. No.: 15/546,431

(22) PCT Filed: Jan. 13, 2016

(86) PCT No.: PCT/JP2016/050867
§ 371 (c)(1),
(2) Date: Jul. 26, 2017

(87) PCT Pub. No.: WO2016/125548
PCT Pub. Date: Aug. 11, 2016

(65) Prior Publication Data
US 2018/0265416 A1    Sep. 20, 2018

(30) Foreign Application Priority Data

Feb. 4, 2015 (JP) .................................. 2015-020259

(51) Int. Cl.
| | |
|---|---|
| *C04B 35/5831* | (2006.01) |
| *C04B 35/583* | (2006.01) |
| *C04B 35/645* | (2006.01) |
| *B23B 27/14* | (2006.01) |
| *B23B 27/20* | (2006.01) |
| *C01B 21/064* | (2006.01) |

(52) U.S. Cl.
CPC ........ *C04B 35/5831* (2013.01); *B23B 27/148* (2013.01); *C04B 35/583* (2013.01); *C04B 35/645* (2013.01); *B23B 2226/125* (2013.01); *C04B 2235/386* (2013.01); *C04B 2235/656* (2013.01); *C04B 2235/781* (2013.01)

(58) Field of Classification Search
CPC . C04B 35/5831; C04B 35/583; C04B 35/645; C04B 2235/386; C04B 2235/52; C04B 2235/528; C04B 2235/5436; C04B 2235/5454; C04B 2235/5472; C04B 2235/656; C04B 2235/781; C04B 2235/783; C04B 2235/785; C04B 2235/786; C04B 2235/788; C01B 21/064; B23B 27/14; B23B 27/148; B23B 27/20
See application file for complete search history.

(56) References Cited

U.S. PATENT DOCUMENTS

| | | | |
|---|---|---|---|
| 9,416,304 B2 * | 8/2016 | Ishida | ................. C09K 3/1418 |
| 2014/0026492 A1 | 1/2014 | Tatsumi et al. | |
| 2015/0000207 A1 | 1/2015 | Ishida et al. | |
| 2018/0029942 A1 | 2/2018 | Ishida et al. | |
| 2018/0265416 A1 | 9/2018 | Ishida et al. | |

FOREIGN PATENT DOCUMENTS

| | | |
|---|---|---|
| EP | 3255023 A1 | 12/2017 |
| JP | S47-034099 A | 11/1972 |
| JP | S49-027518 A | 7/1974 |
| JP | S49-27518 B | 7/1974 |
| JP | S54-033510 A | 3/1979 |
| JP | H03-159964 A | 7/1991 |
| JP | H08-047801 A | 2/1996 |
| JP | H08-47801 A | 2/1996 |
| JP | H08-336705 A | 12/1996 |
| JP | H11-246271 A | 9/1999 |
| JP | 2007-217281 A | 8/2007 |
| JP | 2012-148932 A | 8/2012 |
| JP | 2014-034487 A | 2/2014 |
| JP | 2014-080322 A | 5/2014 |
| JP | 2015202981 A | 11/2015 |

(Continued)

OTHER PUBLICATIONS

Dubrovinskaia et al., "Superhard nanocomposite of dense polymorphs of boron nitride: Noncarbon material has reached diamond hardness," Applied Physics Letter 90, 2017, pp. 101912-101912-3 (3 pages) [Cited in Communication dated Jun. 22, 2018 in counterpart European patent application].

(Continued)

*Primary Examiner* — Pegah Parvini
(74) *Attorney, Agent, or Firm* — Baker Botts L.L.P.; Michael A. Sartori

(57) ABSTRACT

It is an object to provide a cubic boron nitride polycrystalline material excellent in toughness. A cubic boron nitride polycrystalline material containing fine cubic boron nitride which is granular, has a maximum grain size not greater than 100 nm, and has an average grain size not greater than 70 nm and at least one of plate-shaped cubic boron nitride in a form of a plate having an average major radius not smaller than 50 nm and not greater than 10000 nm and coarse cubic boron nitride which is granular, has a minimum grain size exceeding 100 nm, and has an average grain size not greater than 1000 nm is provided.

6 Claims, No Drawings

(56) References Cited

FOREIGN PATENT DOCUMENTS

| WO | 2013/031681 A1 | 3/2013 | | |
|---|---|---|---|---|
| WO | 2013031681 A1 | 3/2013 | | |
| WO | WO 2014/161816 | * 10/2014 | ............ | E21B 10/567 |
| WO | 2016125548 A1 | 8/2016 | | |

OTHER PUBLICATIONS

Sumiya et al., "Mechanical properties of nano-polycrystalline cBN synthesized by direct conversion sintering under HPHT," Diamond and Related Materials 41, 2014, pp. 14-19 [Cited in Communication dated Jun. 22, 2018 in counterpart European patent application].
U.S. Appl. No. 15/549,783, filed Aug. 9, 2017.
Harano et al.,"Cutting performance of binder-Less nano-polycrystalline cBN tool," Advanced Materials Research, ISSN: 1662-8985, vol. 1017, pp. 389-392 [Cited in Communication dated Jun. 25, 2018 in counterpart European Patent Application and Cited in U.S. Appl. No. 15/549,783].
Office Action in U.S. Appl. No. 15/549,783, dated Jan. 29, 2019.
Office Action in U.S. Appl. No. 15/549,783, dated Apr. 25, 2019.
Notice of Allowance in U.S. Appl. No. 15/549,783, dated Aug. 14, 2019.

* cited by examiner

CUBIC BORON NITRIDE POLYCRYSTALLINE MATERIAL, CUTTING TOOL, WEAR RESISTANT TOOL, GRINDING TOOL, AND METHOD OF MANUFACTURING CUBIC BORON NITRIDE POLYCRYSTALLINE MATERIAL

TECHNICAL FIELD

The present invention relates to a cubic boron nitride polycrystalline material, a cutting tool, a wear resistant tool, a grinding tool, and a method of manufacturing a cubic boron nitride polycrystalline material.

BACKGROUND ART

Cubic boron nitride is hardest second to diamond and excellent also in thermal stability and chemical stability. Since cubic boron nitride is more stable toward an iron-based material than diamond, a cubic boron nitride sintered material has been used for a tool for machining an iron-based material.

The cubic boron nitride sintered material, however, contains a binder in an amount approximately not lower than 10 volume % and not higher than 40 volume % (10 to 40 volume %) and the binder has been a cause for lowering in strength, heat resistance, and thermal diffusibility of the sintered material. Therefore, in particular in cutting of an iron-based material at a high speed, thermal load has been great, chipping or generation of a crack in a cutting edge has been likely, and lifetime of the tool has been short.

A technique for solving this problem includes a method of manufacturing a cubic boron nitride sintered material with a catalyst instead of a binder. In this method, hexagonal boron nitride is employed as a source material and reaction and sintering thereof is performed by employing magnesium boronitride ($Mg_3BN_3$) or the like as a catalyst. Since the cubic boron nitride sintered material obtained with this method is free from a binder, cubic boron nitride is firmly bonded to cubic boron nitride and the cubic boron nitride sintered material is high in thermal conductivity. Therefore, the cubic boron nitride sintered material is used for a heat sink material or a tape automated bonding (TAB) bonding tool. A small amount of the catalyst, however, remains in this sintered material. Therefore, when heat is applied, a small crack tends to be generated due to a difference in thermal expansion between the catalyst and cubic boron nitride and the cubic boron nitride sintered material is not suited for a cutting tool or the like. In addition, the cubic boron nitride sintered material has a large grain size around 10 μm. Therefore, though the cubic boron nitride sintered material is high in thermal conductivity, it is low in strength and cannot withstand cutting applications in which load is high.

A cubic boron nitride sintered material is obtained also by directly converting and simultaneously sintering atmospheric pressure type boron nitride such as hexagonal boron nitride into cubic boron nitride at an ultra-high pressure and a high temperature without using a catalyst (direct conversion sintering). For example, Japanese Patent Laying-Open No. 47-034099 (PTD 1) and Japanese Patent Laying-Open No. 03-159964 (PTD 2) show a method of obtaining a cubic boron nitride sintered material by converting hexagonal boron nitride into cubic boron nitride at an ultra-high pressure and a high temperature. A method of obtaining a cubic boron nitride sintered material by employing a pyrolytic boron nitride as a source material is available. A method of such a type is shown, for example, in Japanese Patent Laying-Open No. 54-033510 (PTD 3) and Japanese Patent Laying-Open No. 08-047801 (PTD 4). In this method, a condition not lower than 7 GPa and 2100° C. is required.

Japanese Patent Publication No. 49-027518 (PTD 5) and Japanese Patent Laying-Open No. 11-246271 (PTD 6) describe a method of obtaining a cubic boron nitride sintered material under a condition milder than the condition above.

CITATION LIST

Patent Document

PTD 1: Japanese Patent Laying-Open No. 47-034099
PTD 2: Japanese Patent Laying-Open No. 03-159964
PTD 3: Japanese Patent Laying-Open No. 54-033510
PTD 4: Japanese Patent Laying-Open No. 08-047801
PTD 5: Japanese Patent Publication No. 49-027518
PTD 6: Japanese Patent Laying-Open No. 11-246271

SUMMARY OF INVENTION

Technical Problem

PTD 5 discloses a method of obtaining a cubic boron nitride sintered material under such conditions as a pressure of 6 GPa and 1100° C. With this method, a grain of hexagonal boron nitride employed as a source material is not greater than 3 μm. Therefore, hexagonal boron nitride contains a boron oxide impurity or an adsorption gas in an amount of approximately several mass %. Therefore, under the influence by such an impurity or an adsorption gas, sintering does not sufficiently progress. Since an oxide is contained, hardness, strength, and heat resistance are lowered and use as a cutting tool and a wear resistant tool cannot be made.

In order to solve the problem above, PTD 6 discloses a method of synthesis under a condition from 6 to 7 GPa and from 1550 to 2100° C. with low-crystalline hexagonal boron nitride being employed as a source material. According to the disclosure, a cubic boron nitride polycrystalline material synthesized with this method has a crystal grain size approximately from 0.1 to 1 μm.

In the cubic boron nitride polycrystalline material obtained with the method above, however, a grain size of a cubic boron nitride crystal is determined by a temperature of synthesis, and normally, it has a homogenous structure in which grain sizes of cubic boron nitride crystals are uniform around an average grain size ±0.2 μm. The cubic boron nitride polycrystalline material obtained with the method above thus has the homogenous structure. Therefore, when a small crack is generated, the crack tends to develop and the cubic boron nitride polycrystalline material is disadvantageously brittle.

In view of the problems as above, an object of the present disclosure is to provide a cubic boron nitride polycrystalline material excellent in toughness.

Solution to Problem

A cubic boron nitride (cBN) polycrystalline material according to one manner of the present invention contains fine cBN which is granular, has a maximum grain size not greater than 100 nm, and has an average grain size not greater than 70 nm and at least one of plate-shaped cBN which is in a form of a plate and has an average major radius not smaller than 50 nm and not greater than 10000 nm and coarse cBN which is granular, has a minimum grain size exceeding 100 nm, and has an average grain size not greater than 1000 nm.

A method of manufacturing a cBN polycrystalline material according to one manner of the present invention includes preparing a source material composition composed of coarse hexagonal boron nitride (hBN) powders and non-hexagonal boron nitride (non-hBN) powders as a starting substance and directly converting and sintering the source material composition into cBN at a temperature and a pressure satisfying a condition of $P \geq 0.0000132T^2 - 0.0583T + 71.793$, $T \leq 2200$, and $P \leq 25$, where T represents a temperature (° C.) and P represents a pressure (GPa), the coarse hBN powders having an average grain size not smaller than 1 μm, and the non-hBN powders being non-crystalline boron nitride powders or crystalline boron nitride powders other than hexagonal boron nitride in at least any shape of a sphere, a tube, a wall, and a horn.

A method of manufacturing a cBN polycrystalline material according to one manner of the present invention includes preparing a source material composition composed of coarse hBN powders and fine hBN powders as a starting substance and directly converting and sintering the source material composition into cBN at a temperature and a pressure satisfying a condition of $P \geq 0.0000132T^2 - 0.0583T + 71.793$, $T \leq 2200$, and $P \leq 25$, where T represents a temperature (° C.) and P represents a pressure (GPa), the coarse hBN powders having an average grain size not smaller than 1 μm, and the fine hBN powders having an average grain size smaller than 100 nm.

Advantageous Effects of Invention

According to the above, the cBN polycrystalline material can be excellent in toughness.

DESCRIPTION OF EMBODIMENTS

[Description of Embodiment of the Present Invention]
Embodiments of the present invention will initially be listed and described.

The present inventors have conducted dedicated studies for solving the problems and found that a tough cBN polycrystalline material is obtained by directly converting a source material composition containing several types of hBN powders different in characteristics into cBN at a high temperature and a high pressure.

[1] A cBN polycrystalline material according to one manner of the present invention includes fine cubic boron nitride which is granular, has a maximum grain size not greater than 100 nm, and has an average grain size not greater than 70 nm and at least one of plate-shaped cubic boron nitride which is in a form of a plate and has an average major radius not smaller than 50 nm and not greater than 10000 nm and coarse cubic boron nitride which is granular, has a minimum grain size exceeding 100 nm, and has an average grain size not greater than 1000 nm.

According to the cBN polycrystalline material, plate-shaped cBN and/or coarse cBN prevent(s) development of a crack and hence a tough polycrystalline material is obtained.

[2] Preferably, the cBN polycrystalline material further includes wurtzite type boron nitride (hereinafter also denoted as "wBN") and a content of wBN is not lower than 0.01 volume % and not higher than 80 volume %. Thus, the polycrystalline material can have a denser structure.

[3] Preferably, the cBN polycrystalline material further includes compression type hexagonal boron nitride (hereinafter also denoted as "compression type hBN"), and a content of compression type hBN is not lower than 0.01 volume % and not higher than 0.5 volume %. Thus, development of a crack can be prevented and toughness can be improved.

"Compression type hBN" refers to hBN similar in crystal structure to normal hBN and smaller in interval between planes in a direction of a c axis than normal hBN (0.333 nm).

[4] A cutting tool according to one manner of the present invention includes the cBN polycrystalline material described in any one of [1] to [3].

The cutting tool is excellent in toughness based on the properties of the cBN polycrystalline material described above.

[5] A wear resistant tool according to one manner of the present invention includes the cBN polycrystalline material described in any one of [1] to [3].

The wear resistant tool is excellent in toughness based on the properties of the cBN polycrystalline material described above.

[6] A grinding tool according to one manner of the present invention includes the cBN polycrystalline material described in any one of [1] to [3].

The grinding tool is excellent in toughness based on the properties of the cBN polycrystalline material described above.

These tools may be composed of the cBN polycrystalline material in its entirety or in part (for example, a cutting edge portion of the cutting tool).

[7] A method of manufacturing a cBN polycrystalline material according to one manner of the present invention includes preparing a source material composition composed of coarse hBN powders and non-hBN powders as a starting substance and directly converting and sintering the source material composition into cBN at a temperature and a pressure satisfying a condition of $P \geq 0.0000132T^2 - 0.0583T + 71.793$, $T \leq 2200$, and $P \leq 25$, where T represents a temperature (° C.) and P represents a pressure (GPa), the coarse hBN powders having an average grain size not smaller than 1 μm, and the non-hBN powders being composed of non-crystalline boron nitride or crystalline boron nitride other than hBN in at least any shape of a sphere, a tube, a wall, and a horn.

According to the manufacturing method, the cBN polycrystalline material described in any one of [1] to [3] can readily be manufactured.

"Direct conversion" means direct conversion of a starting substance into cBN under a catalyst-free condition in which neither of a sintering aid and a catalyst is added. In the manufacturing method above, a starting substance is sintered simultaneously with direct conversion, and the manufacturing method may be referred to as "direct conversion sintering." Direct conversion sintering achieves firm bonding between grains in the cBN polycrystalline material.

[8] In the manufacturing method, preferably, a content of the non-hBN powders in the source material composition is not lower than 10 volume % and not higher than 95 volume %. The cBN polycrystalline material higher in toughness can thus be manufactured.

[9] A method of manufacturing a cBN polycrystalline material according to one manner of the present invention includes preparing a source material composition composed of coarse hBN powders and fine hBN powders as a starting substance and directly converting and sintering the source material composition into cBN at a temperature and a pressure satisfying a condition of $$P \geq 0.0000132T^2 - 0.0583T + 71.793,$$

$$T \leq 2200, \text{ and}$$

$$P \leq 25,$$

where T represents a temperature (° C.) and P represents a pressure (GPa), the coarse hBN powders having an average grain size not smaller than 1 µm, and the fine hBN powders having an average grain size smaller than 100 nm.

According to the manufacturing method, the cBN polycrystalline material described in any one of [1] to [3] can readily be manufactured.

[10] In the manufacturing method, preferably, a content of the fine hBN powders in the source material composition is not lower than 10 volume % and not higher than 95 volume %. The cBN polycrystalline material higher in toughness can thus be manufactured.

[Details of Embodiment of the Present Invention]

Though one embodiment of the present invention (hereinafter denoted as the "present embodiment") will be described below in detail, the present embodiment is not limited thereto.

<Cubic Boron Nitride Polycrystalline Material (cBN Polycrystalline Material)>

The cBN polycrystalline material according to the present embodiment includes a mixed structure composed of fine cBN and at least any one of plate-shaped cBN and coarse cBN. The cBN polycrystalline material includes one of plate-shaped cBN and coarse cBN in addition to fine cBN or includes both of plate-shaped cBN and coarse cBN in addition to fine cBN. The cBN polycrystalline material in the present embodiment may contain an inevitable impurity so long as it includes such a mixed structure and effects of the present embodiment are exhibited. Examples of the inevitable impurity include nitrogen ($N_2$), hydrogen ($H_2$), and oxygen ($O_2$).

In the cBN polycrystalline material according to the present embodiment, a content of atmospheric pressure type boron nitride is preferably not higher than 0.1 volume %. A content of atmospheric pressure type boron nitride exceeding 0.1 volume % may lead to significant lowering in strength.

The cBN polycrystalline material in the present embodiment substantially contains none of a binder, a sintering aid, and a catalyst, which is one of advantages of the cBN polycrystalline material in the present embodiment, because disadvantages caused by a contained binder, sintering aid, or catalyst as in a conventional cBN sintered material can be overcome.

Though the cBN polycrystalline material according to the present embodiment is a sintered material, the sintered material is normally intended to contain a binder and hence the term "polycrystalline material" is employed in the present embodiment.

(Cubic Boron Nitride (cBN))

The cBN polycrystalline material in the present embodiment contains fine cBN and at least any one of plate-shaped cBN and coarse cBN as described above. cBN is firmly bonded to cBN and forms a dense mixed structure.

"Fine cBN" means a crystal of cBN which is granular, has a grain size (a maximum grain size) not greater than 100 nm, and has an average grain size not greater than 70 nm. "Being granular" means a perfect spherical shape, a spherical shape, or an irregular shape.

"Plate-shaped cBN" means a crystal of cBN which is in a form of a plate and has an average major radius not smaller than 50 nm and not greater than 10000 nm. The "plate-shaped" means a shape different from "granular" and means a shape like a scale, a flake, or a flat plate. A shape having an aspect ratio not smaller than 3, which is calculated by dividing a major radius of cBN by a minor radius of cBN, is herein defined as "plate-shape".

"Coarse cBN" means a crystal of cBN which is granular, has a grain size (a minimum grain size) exceeding 100 nm, and has an average grain size not greater than 1000 nm.

cBN contained in the cBN polycrystalline material can be categorized into fine cBN, coarse cBN, and plate-shaped cBN by using a scanning electron microscope (SEM).

Specifically, initially, a surface of the cBN polycrystalline material is polished and the polished surface is observed with the SEM at a magnification from 1000× to 100000× to obtain an SEM image. Then, cBN having an aspect ratio not smaller than 3 of cBN in the SEM image is defined as plate-shaped cBN. Then, cBN having a grain size not greater than 100 nm of cBN other than cBN defined as plate-shaped cBN (that is, cBN having an aspect ratio smaller than 3) is defined as fine cBN, and cBN having a grain size exceeding 100 nm is defined as coarse cBN.

An average grain size of fine cBN can be found with an intercept procedure with the use of an SEM. Specifically, a circle is drawn in the SEM image and eight straight lines are radially drawn from the center of the circle to the outer circumference of the circle (such that an angle of intersection between the straight lines is substantially equal).

In this case, a magnification in observation and a diameter of the circle are preferably set such that the number of fine cBN grains (crystal grains) located on one straight line is approximately from 10 to 50.

In succession, the number of intersections with crystal grain boundaries of fine cBN grains for each straight line is counted and an average lineal intercept length is calculated by dividing a length of the straight line by the number of intersections. A numeric value obtained by multiplying the average lineal intercept length by 1.128 is defined as an average grain size (this method is in conformity with a method of calculation of a nominal grain size defined under the ASTM standards). Suitably, several SEM images are more preferably used, an average grain size is found with the procedure as above for each image, and an average value of the average grain sizes is defined as the "average grain size of fine cBN."

With measurement with the procedure as above, a grain size of fine grains other than cBN (for example, crystal grains of wBN) may be included. Even when a grain size of grains other than cBN may be included, that grain size is regarded as an average grain size of fine cBN.

An average grain size of coarse cBN can also be found with the intercept procedure with the use of an SEM similarly to an average grain size of fine cBN. In this case as well, a magnification in observation and a diameter of the circle are preferably set such that the number of coarse cBN grains (crystal grains) located on one straight line is approximately from 10 to 50.

An average major radius of plate-shaped cBN can also be found with the intercept procedure with the use of an SEM similarly to an average grain size of fine cBN. In this case as well, a magnification in observation and a diameter of the circle are preferably set such that the number of plate-shaped cBN grains (crystal grains) located on one straight line is approximately from 10 to 50.

The present inventors have found that in a cBN polycrystalline material having a mixed structure composed of the two types or the three types of cBN, the mixed structure can have a high hardness and plate-shaped cBN and/or coarse cBN effectively prevent(s) development of a small crack when such a crack is generated. Therefore, the cBN polycrystalline material in the present embodiment is a tough polycrystalline material excellent in resistance to crack propagation.

The cBN polycrystalline material in the present embodiment has the mixed structure of cBN containing not only such fine cBN but also at least one of plate-shaped cBN and coarse cBN and thus can be applied to applications high in load when it is used in a tool or the like. In particular, the cBN polycrystalline material in the present embodiment preferably contains all of fine cBN, plate-shaped cBN, and coarse cBN, in which case, the cBN polycrystalline material is particularly excellent in toughness.

In the cBN polycrystalline material in the present embodiment, fine cBN has a grain size (a maximum grain size) preferably from 30 to 95 nm or smaller, more preferably from 35 to 95 nm, and further preferably from 70 to 95 nm. Fine cBN has an average grain size preferably not greater than 70 nm and more preferably not greater than 54 nm. A smaller average grain size of fine cBN is preferred from a point of view of an enhanced effect, that is, a hardness, and hence a lower limit thereof does not have to be set. From a point of view of efficiency in manufacturing, however, the lower limit is set to 10 nm.

In the cBN polycrystalline material in the present embodiment, plate-shaped cBN has an average major radius preferably from 300 to 2100 nm, more preferably from 300 to 1100 nm, and further preferably from 300 to 1000 nm.

In the cBN polycrystalline material in the present embodiment, coarse cBN has an average grain size preferably from 150 to 320 nm and more preferably from 160 to 320 nm.

A content of cBN in the cBN polycrystalline material (a total amount of the two types or the three types of cBN) is preferably not lower than 20 volume %. Namely, a ratio of the mixed structure in the cBN polycrystalline material is preferably not lower than 20 volume %. In this case, the cBN polycrystalline material can be particularly excellent in resistance to crack propagation for suppressing development of a crack. A content of cBN in the cBN polycrystalline material is more preferably not lower than 92 volume % and further preferably not lower than 98 volume %.

A content (volume %) of each of cBN, wBN which will be described later, and compression type hBN in the cBN polycrystalline material can be found with a conventionally known method such as an X-ray diffraction method.

(Wurtzite Type Boron Nitride (wBN))

The cBN polycrystalline material in the present embodiment may contain wBN and preferably contains such wBN in an amount not lower than 0.01 volume % so that the structure of the polycrystalline material is thus denser. The upper limit of the content of wBN is not higher than 80 volume % from a point of view of characteristics of wBN. Presence of wBN is effective in preventing development of a crack and improving toughness, however, wBN is a metastable phase in transition from hBN to cBN, and hence wBN is characterized by being more unstable and lower in wear resistance than cBN. A more preferred range of a content of wBN is from 0.01 to 20 volume % and further preferably from 0.01 to 1 volume %.

When the cBN polycrystalline material contains wBN, the mixed structure composed of a plurality of cBN crystal grains and a plurality of wBN crystal grains form regions different from each other. cBN is firmly bonded to cBN as the mixed structure, wBN is also firmly bonded to wBN, and cBN and wBN are also firmly bonded to each other. Therefore, a dense structure is consequently obtained.

(Compression Type Hexagonal Boron Nitride (Compression Type hBN))

The cBN polycrystalline material in the present embodiment may contain compression type hBN and preferably contains such compression type hBN in an amount from 0.01 to 0.5 volume %. Thus, a function to prevent development of a crack and improve toughness can be achieved. By allowing the presence of compression type hBN, sintering can be performed in a broad temperature range and productivity is improved. When a content of compression type hBN exceeds 0.5 volume %, concentration of stress in compression type hBN is great and strength may lower. Therefore, when the cBN polycrystalline material contains further compression type hBN, the upper limit of the content is set to 0.5 volume %. A content in volume of compression type hBN is more preferably from 0.01 to 0.1 volume % and particularly preferably from 0.05 to 0.1 volume %.

Though the cBN polycrystalline material may contain both of wBN and compression type hBN, it preferably contains any one of wBN and compression type hBN, in which case, the cBN polycrystalline material can be higher in toughness.

<Applications>

Since the cBN polycrystalline material in the present embodiment is tough, it is suitably used for a cutting tool, a wear resistant tool, a grinding tool, and the like. The cutting tool, the wear resistant tool, and the grinding tool in the present embodiment contain the cBN polycrystalline material above.

Each tool may be composed of the cBN polycrystalline material in its entirety or only in part (for example, a cutting edge portion in an example of a cutting tool). Each tool may have a coating formed on a surface thereof.

Examples of the cutting tool can include a drill, an end mill, a throwaway tip for a drill, a throwaway tip for an end mill, a throwaway tip for milling, a throwaway tip for turning, a metal saw, a gear cutting tool, a reamer, a tap, and a cutting tool.

Examples of the wear resistant tool can include a die, a scriber, a scribing wheel, and a dresser.

Examples of the grinding tool can include an abrasive wheel.

<Manufacturing Method>

A method of manufacturing a cBN polycrystalline material according to the present embodiment includes preparing a source material composition composed of coarse hBN powders and non-hBN powders as a starting substance (hereinafter also denoted as a "preparation step") and directly converting and sintering the source material composition into cBN at a temperature and a pressure satisfying a condition (hereinafter also referred to as a "synthesis condition A") of $P \geq 0.000013 2T^2 - 0.0583T + 71.793,$ $T \leq 2200,$ and $P \leq 25,$ where T represents a temperature (° C.) and P represents a pressure (GPa) (hereinafter also denoted as a "sintering step"). Each step will be described below.

(Preparation Step)

In the preparation step, each of coarse hBN powders and non-hBN powders may be prepared in any manner. Each may be obtained with a conventionally known synthesis method or commercially available. A source material composition can be prepared by mixing obtained (purchased) powders.

The "coarse hBN powders" refer to powders composed of boron nitride having a hexagonal crystal structure and having an average grain size not smaller than 1 μm. An average grain size of the hBN powders employed as a source material (a starting substance) is measured with laser diffraction and scattering with the use of laser beams.

hBN powders having an average grain size greater than an average grain size (or an average major radius) of various types of cBN in an obtained cBN polycrystalline material can be adopted as coarse hBN powders. This is because sintered cBN is smaller in grain size than a source material (a starting substance) as bond between hBN and hBN is cut and hBN is recombined after recombination of atoms in transition from hBN to cBN. When a source material has a small grain size, however, there will be more grain boundaries where there is no inherent bond between hBN and hBN. Therefore, converted cBN has a smaller grain size. In contrast, when a source material has a large grain size, cBN has an increased grain size.

Therefore, an upper limit value of an average grain size of coarse hBN powders is set preferably to 10 μm and more preferably to 8 μm in view of an average grain size (or an average major radius) of cBN in a desired cBN polycrystalline material. The "non-hBN powders" refer to powders composed of boron nitride not having a hexagonal crystal structure and powders composed of non-crystalline boron nitride or powders composed of crystalline boron nitride in at least any shape of a sphere, a tube, a wall, and a horn.

Examples of non-crystalline boron nitride can include amorphous boron nitride. Examples of crystalline boron nitride can include nanocrystalline boron nitride. Examples of nanocrystalline boron nitride include a boron nitride nano-onion in a shape like an onion (a sphere), a boron nitride nanotube in a tubular shape, a boron nitride nanowall in a shape like a wall, and a boron nitride nanohorn in a shape like a horn.

Though a size (an area) of the non-hBN powders is not particularly restricted, it preferably tends to be smaller than an average grain size of coarse hBN powders. For example, a tubular boron nitride nanotube has a diameter preferably from 1 to 100 nm and a spherical boron nitride nano-onion has a grain size preferably from 5 to 50 nm.

A content of the non-hBN powders in a source material composition prepared in the preparation step is preferably from 10 to 95 volume %, more preferably from 20 to 50 volume %, and further preferably from 10 to 50 volume %. Both of the coarse hBN powders and the non-hBN powders can thus be present in the source material composition in a balanced manner and hence the cBN polycrystalline material having the mixed structure composed of the two types or the three types of cBN described above can readily be obtained.

In the preparation step, fine hBN powders may be employed instead of the non-hBN powders.

The fine hBN powders are different from the coarse hBN powders in their average grain size smaller than 100 nm. Though the coarse hBN powders and the fine hBN powders are each an aggregate of grains having a grain size distribution, there is no region where grain size distributions overlap each other because their average grain sizes are sufficiently distant from each other.

Fine hBN powders having a grain size greater than an average grain size of fine cBN in the obtained cBN polycrystalline material can be adopted as the fine hBN powders. As described above, sintered cBN is smaller in grain size than a source material (a starting substance) because bond between hBN and hBN is cut and hBN is recombined after recombination of atoms in transition from hBN to cBN. Therefore, the fine hBN powders are set to have a grain size smaller than 100 nm and a lower limit value thereof is set to 5 nm for a reason in terms of manufacturing.

A content of the fine hBN powders in the source material composition prepared in the preparation step is preferably from 10 to 95 volume % and more preferably from 50 to 95 volume %. Both of the coarse hBN powders and the fine hBN powders can thus be present in the source material composition in a balanced manner and hence the cBN polycrystalline material having the mixed structure composed of the two types or the three types of cBN described above can readily be obtained.

(Sintering Step)

In the sintering step, a pressure P (GPa) and a temperature T (° C.) should satisfy the synthesis condition A above because such a problem as grain growth on a high temperature side and residue of unconverted hBN on a low temperature side is caused.

Temperature T (° C.) in the synthesis condition A is not particularly limited so long as a cBN polycrystalline material is obtained, and it is not necessary to define a lower limit value thereof. Temperature T (° C.) is more preferably set to 1300 to 2200° C.

Pressure P (GPa) in the synthesis condition A is not particularly limited either so long as a cBN polycrystalline material is obtained, and it is not necessary to define a lower limit value thereof. Pressure P (GPa) is more preferably set to 8 to 20 GPa.

A time period of application of the temperature and the pressure in the sintering step is set to 5 to 20 minutes. A time period shorter than 5 minutes will lead to insufficient sintering, and a time period longer than 20 minutes does not make a difference in sintered state and is disadvantageous in terms of cost. A more preferred time period of application is from 10 to 20 minutes.

The sintering step is a step of converting and sintering a source material composition into cBN. Conversion of the source material composition into cBN is direct conversion of the source material composition (that is, boron nitride) alone into cBN without using a sintering aid or a catalyst, and conversion is normally performed simultaneously with sintering.

With the manufacturing method described above, the cBN polycrystalline material according to the present embodiment, that is, the tough cBN polycrystalline material containing fine cBN and plate-shaped cBN and/or coarse cBN, can be manufactured.

EXAMPLES

Though the present invention will be described in further detail below with reference to Examples, the present invention is not limited thereto.

Examples 1 to 10 and Comparative Examples 1 to 4 cBN polycrystalline materials according to Examples 1 to 10 were fabricated with the following method. Initially, in each Example, a starting substance was prepared (the preparation step). Coarse hBN powders, fine hBN powders, and non-hBN powders were prepared as starting substances, and a source material composition to be used was varied for each Example.

Then, the prepared source material composition was placed in a capsule composed of a high-melting-point metal and held for 20 minutes at a temperature and a pressure shown in Table 1 (the field of "synthesis condition") with the use of an ultra-high-pressure and high-temperature generator. The source material composition was thus converted to cBN and sintered (the sintering step). The cBN polycrystalline material was thus obtained.

The method of manufacturing Comparative Example 1 is different from that in Examples in that it satisfies the synthesis condition A but the source material composition contains neither of fine hBN and non-hBN. The method of manufacturing Comparative Examples 2 to 4 is different from that in Examples in that it satisfies the synthesis condition A but the source material composition contains no coarse hBN.

<Evaluation>

Compositions and grain sizes of the cBN polycrystalline materials in Examples 1 to 10 and Comparative Examples 1 to 4 obtained as above were determined with a technique below and a cutting test was further conducted with the use of each cBN polycrystalline material to evaluate wear resistance and chipping resistance of each cBN polycrystalline material.

(Composition)

Cubic boron nitride (cBN), compression type hexagonal boron nitride (compression type hBN), and wurtzite type boron nitride (wBN) contained in each cBN polycrystalline material were identified by using an X-ray diffraction apparatus and a content thereof was calculated. A source of X-rays of this apparatus was Cu-Kα rays having a wavelength of 1.54 Å. Table 2 shows results.

TABLE 1

| | Source Material Composition | | | | Synthesis Condition | |
|---|---|---|---|---|---|---|
| | | Other than Coarse hBN Powders | | | | |
| | Coarse hBN Powders | Fine hBN Powders | Non-hBN Powders | Content (Volume %) | Pressure (GPa) | Temperature (° C.) |
| Example 1 | 10 μm | 50 nm | — | 95 | 10 | 1900 |
| Example 2 | 10 μm | — | Nanotube | 40 | 15 | 1500 |
| Example 3 | 8 μm | — | Nanohorn | 50 | 15 | 2000 |
| Example 4 | 8 μm | — | Nano-Onion | 30 | 15 | 2200 |
| Example 5 | 5 μm | 10 nm | — | 50 | 8 | 2200 |
| Example 6 | 5 μm | — | Nano-Onion | 50 | 20 | 1300 |
| Example 7 | 3 μm | — | Nanowall | 50 | 10 | 2100 |
| Example 8 | 3 μm | — | Nanotube | 50 | 20 | 2000 |
| Example 9 | 1 μm | 98 nm | — | 10 | 25 | 1100 |
| Example 10 | 1 μm | — | Nanohorn | 20 | 10 | 2100 |
| Comparative Example 1 | 8 μm | — | — | — | 15 | 2000 |
| Comparative Example 2 | — | 10 nm | — | 100 | 10 | 1900 |
| Comparative Example 3 | — | — | Nanotube | 100 | 20 | 1300 |
| Comparative Example 4 | — | — | Nano-Onion | 100 | 15 | 1500 |

In the field of the source material composition in Table 1, "coarse hBN powders" mean hBN powders having an average grain size of 1 μm, "fine hBN powders" mean hBN powders having an average grain size smaller than 100 nm, and "non-hBN powders" mean boron nitride powders other than hBN (specifically, nanocrystalline boron nitride powders). In the fields of "coarse hBN" and "fine hBN," average grain sizes of coarse hBN and/or fine hBN used in each Example and each Comparative Example are shown. In the field of "non-hBN", a type of a nanocrystal as non-hBN used in each Example and each Comparative Example is shown. In the field of "content (volume %)," a content of powders other than the coarse hBN powders in the source material composition (that is, a content of the fine hBN powders or the non-hBN powders) is shown.

In the method of manufacturing Examples 1 to 10, a synthesis condition in the sintering step (a temperature and a pressure) satisfies the synthesis condition A.

(Average Grain Size and Maximum Grain Size of Fine cBN)

An average grain size of fine cBN contained in each cBN polycrystalline material was found with the intercept procedure with the use of an SEM.

Initially, a surface of the cBN polycrystalline material was polished and the polished surface was observed with the SEM to obtain an SEM image. Then, cBN having an aspect ratio not smaller than 3 of cBN in the SEM image was defined as plate-shaped cBN. Then, of remaining cBN, cBN having a grain size not greater than 100 nm was determined as fine cBN and cBN having a grain size exceeding 100 nm was determined as coarse cBN.

Then, a circle was drawn in the SEM image and eight straight lines were radially drawn from the center of the circle to the outer circumference of the circle (such that an angle of intersection between the straight lines was substantially equal). In this case, a magnification in observation and a diameter of the circle were set such that the number of fine cBN grains (crystal grains) located on one straight line was approximately from 10 to 50.

In succession, the number of intersections with crystal grain boundaries of fine cBN for each straight line was counted and an average lineal intercept length was found by dividing a length of the straight line by the number of intersections. A numeric value obtained by multiplying the average lineal intercept length by 1.128 was defined as an average grain size of the fine cBN grains. A largest grain size of the observed fine cBN grains was defined as the maximum grain size of fine cBN.

In calculating an average grain size of the fine cBN grains, a magnification of the SEM image was set to 30000×. This is because at a magnification lower than this, the number of grains in the circle is great, it is difficult to observe grain boundaries, miscount tends to occur, and a plate-shaped structure is more likely to be included in drawing lines. At a magnification equal to or higher than this, the number of grains in the circle is too small and an accurate average grain size cannot be calculated.

Three SEM images resulting from micrographing of different portions of one sample were used for each Example and each Comparative Example, an average grain size was found with the procedure above for each SEM image, and an average value of the three obtained average grain sizes was defined as "average grain size of fine cBN." Table 2 shows results in the field of "product".

(Average Grain Size of Coarse cBN)

An average grain size of coarse cBN contained in each cBN polycrystalline material was found with the intercept procedure with the use of an SEM similarly to an average grain size of fine cBN. Table 2 shows results.

In calculating an average grain size of coarse cBN grains, a magnification of the SEM image was set to 10000×. The reason is the same as the reason in calculation in connection with the fine cBN grains.

(Average Major Radius of Plate-Shaped cBN)

An average major radius of plate-shaped cBN contained in each cBN polycrystalline material was found with the intercept procedure with the use of an SEM similarly to an average grain size of fine cBN. Table 2 shows results.

In calculating an average major radius of plate-shaped cBN grains, a magnification of the SEM image was set to 10000×. The reason is the same as the reason in calculation in connection with the fine cBN grains.

TABLE 2

| | | | | Product | | | | |
|---|---|---|---|---|---|---|---|---|
| | | | Compression | Coarse cBN | | Plate-Shaped cBN | Fine cBN | |
| | cBN Content (Volume %) | wBN Content (Volume %) | Type hBN Content (Volume %) | Average Grain Size (nm) | Minimum Grain Size (nm) | Average Major Radius (nm) | Average Grain Size (nm) | Maximum Grain Size (nm) |
| Example 1 | 98.00 | 2.00 | 0 | 150 | 110 | 1100 | 20 | 35 |
| Example 2 | 92.00 | 8.00 | 0 | — | — | 2100 | 20 | 55 |
| Example 3 | 99.00 | 1.00 | 0 | 180 | 110 | 800 | 38 | 90 |
| Example 4 | 99.50 | 0.50 | 0 | 320 | 150 | 500 | 54 | 95 |
| Example 5 | 99.93 | 0 | 0.07 | 280 | 130 | — | 70 | 93 |
| Example 6 | 40.00 | 60.00 | 0 | — | — | 1200 | 20 | 35 |
| Example 7 | 99.00 | 1.00 | 0 | 210 | 105 | 900 | 36 | 60 |
| Example 8 | 99.00 | 1.00 | 0 | 200 | 120 | 1000 | 53 | 70 |
| Example 9 | 20.00 | 80.00 | 0 | — | — | 500 | 12 | 30 |
| Example 10 | 99.00 | 1.00 | 0 | 160 | 110 | 300 | 45 | 70 |
| Comparative Example 1 | 99.00 | 1.00 | 0 | 190 | 120 | 750 | — | — |
| Comparative Example 2 | 97.00 | 3.00 | 0 | — | — | — | 20 | 35 |
| Comparative Example 3 | 100.00 | 0 | 0 | — | — | — | 20 | 45 |
| Comparative Example 4 | 100.00 | 0 | 0 | — | — | — | 25 | 65 |

As shown in Table 2, it was confirmed that Examples 1 to 4 and 6 to 10 contained 1 to 80 volume % of wBN. The cBN polycrystalline materials in Examples 1, 3, 4, 7, 8, and 10 had the mixed structure composed of crystals of fine cBN, coarse cBN, and plate-shaped cBN. The cBN polycrystalline materials in Examples 2, 6, and 9 had the mixed structure composed of crystals of fine cBN and plate-shaped cBN. cBN polycrystal in Example 5 had the mixed structure composed of crystals of fine cBN and coarse cBN. In contrast, Comparative Examples 1 to 4 did not have the mixed structure.

(Cutting Test)

The cBN polycrystalline materials in Examples and Comparative Examples were machined into cutting inserts. Wear resistance and chipping resistance were evaluated by using these cutting inserts and conducting a cutting test under cutting conditions below. Table 3 shows results.

Type of cutting: Wet cutting

Work material: Round rod of sintered alloy SMF4040 (having six perpendicular grooves extending along an axial direction formed at an equal interval in an outer circumferential surface)

Cutting speed: 100 mm/min.

Depth of cutting: 0.2 mm

Feed: 0.1 mm/rev.

Evaluation method: Amount of wear on flank face and presence and absence of chipping after cutting by 2 km

TABLE 3

| | Presence and Absence of Chipping | Relative Ratio of Wear of Tool |
|---|---|---|
| Example 1 | Absent | 1 |
| Example 2 | Absent | 1.1 |

TABLE 3-continued

| | Presence and Absence of Chipping | Relative Ratio of Wear of Tool |
|---|---|---|
| Example 3 | Absent | 0.9 |
| Example 4 | Absent | 0.9 |
| Example 5 | Absent | 1 |
| Example 6 | Absent | 1.2 |
| Example 7 | Absent | 1 |
| Example 8 | Absent | 0.9 |
| Example 9 | Absent | 1.2 |
| Example 10 | Absent | 0.9 |
| Comparative Example 1 | Present | 2 |
| Comparative Example 2 | Present | 1.6 |
| Comparative Example 3 | Present | 1.4 |
| Comparative Example 4 | Present | 1.5 |

As shown in Table 3, with Example 1 being defined as the reference, amounts of wear in Examples 2 to 10 were 0.9 to 1.2 and no chipping was observed. In contrast, chipping was observed in Comparative Examples 1 to 4. Therefore, it was confirmed that the cBN polycrystalline materials in Examples were tougher than the cBN polycrystalline materials in Comparative Examples.

Though the embodiment and the example of the present invention have been described above, combination of features in each embodiment and example described above as appropriate and various modifications thereof are also originally intended.

It should be understood that the embodiment and the example disclosed herein are illustrative and non-restrictive in every respect. The scope of the present invention is defined by the terms of the claims, rather than the embodiment above, and is intended to include any modifications within the scope and meaning equivalent to the terms of the claims.

The invention claimed is:

1. A cubic boron nitride polycrystalline material comprising:
   fine cubic boron nitride which is granular, has a maximum grain size not greater than 100 nm, and has an average grain size not greater than 70 nm;
   plate-shaped cubic boron nitride which is in a form of a plate and has an average major radius not smaller than 50 nm and not greater than 10000 nm; and
   coarse cubic boron nitride which is granular, has a minimum grain size exceeding 100 nm, and has an average grain size not greater than 1000 nm.

2. The cubic boron nitride polycrystalline material according to claim 1, the cubic boron nitride polycrystalline material further comprising wurtzite type boron nitride, wherein
   a content of the wurtzite type boron nitride is not lower than 0.01 volume % and not higher than 80 volume %.

3. The cubic boron nitride polycrystalline material according to claim 1, the cubic boron nitride polycrystalline material further comprising compression type hexagonal boron nitride, wherein
   a content of the compression type hexagonal boron nitride is not lower than 0.01 volume % and not higher than 0.5 volume %.

4. A cutting tool comprising the cubic boron nitride polycrystalline material according to claim 1.

5. A wear resistant tool comprising the cubic boron nitride polycrystalline material according to claim 1.

6. A grinding tool comprising the cubic boron nitride polycrystalline material according to claim 1.

* * * * *